(12) United States Patent
Ramachandran

(10) Patent No.: US 6,853,720 B2
(45) Date of Patent: Feb. 8, 2005

(54) SOFTWARE CALL CONTROL AGENT

(75) Inventor: Navindra Ramachandran, Auckland (NZ)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 09/967,367

(22) Filed: Sep. 28, 2001

(65) Prior Publication Data
US 2003/0133560 A1 Jul. 17, 2003

(51) Int. Cl.$^7$ .............................. H04M 7/00
(52) U.S. Cl. ............ 379/231; 379/220.01; 379/229; 379/234
(58) Field of Search .................. 379/167.01, 182, 379/229, 231, 232, 233, 234, 245, 246, 265.09, 220.01

(56) References Cited

U.S. PATENT DOCUMENTS 5,724,092 A * 3/1998 Davidsohn et al. ...... 348/14.01
5,946,386 A    8/1999 Rogers et al.
6,075,843 A * 6/2000 Cave ...................... 379/88.13

FOREIGN PATENT DOCUMENTS

| EP | 0 565 850 A1 | 10/1993 |
| EP | 0 883 311 A2 | 12/1998 |
| EP | 0 964 566 A2 | 12/1999 |
| EP | 0 883 311 A3 | 3/2000 |
| GB | 2 336 969 A | 11/1999 |

OTHER PUBLICATIONS

PCT International Search Report for PCT International Application No.: PCT/US 02/ 30791.

* cited by examiner

Primary Examiner—Bing Q. Bui
(74) Attorney, Agent, or Firm—Alan Pedersen-Giles

(57) ABSTRACT

The present disclosure describes a method comprising establishing a connection between a software communication channel and a media server, wherein the software communication channel is presented to the server as a media stream; transmitting to the media server a call object including a media handle; attaching a media application to the media handle; and establishing a connection between the media application and the software communication channel. The disclosure further describes an apparatus comprising a computing platform including a private branch exchange (PBX); a media server installed on the computing platform; and software operative with the computing platform and the media server to establish a connection between a software communication channel and a media server, wherein the software communication channel is presented to the server as a media stream, transmit to the media server a call object including a media handle, attach a media application to the media handle; and establish a connection between the media application and the software communication channel.

24 Claims, 3 Drawing Sheets

US 6,853,720 B2

SOFTWARE CALL CONTROL AGENT

TECHNICAL FIELD

This disclosure relates generally to telecommunication media applications, and in particular, but not exclusively, relates to software control of media applications integrated with a private branch exchange (PBX), or with a PSTN exchange. Note that eventually we could put this technology into the PSTN as the PSTN is simply a much larger version of a PBX.

BACKGROUND

Private branch exchanges (PBXs) are private telephone switching systems commonly found on a user's premises with an attendant console. PBXs are usually connected to a common group of lines from a public switching telephone network (PSTN) to provide service to a number of individual phones, such as in a business office. Users of the PBX share a certain number of outside lines for making telephone calls external to the PBX; such an arrangement is used because it is much less expensive than providing a direct external telephone line to every telephone in the organization.

In addition to PBXs, over the last decade there has been a marked increase in the use of media applications related to voice information. Voice mail is the best known example of a media application, but there are others as well, such as Automated Attendants, Interactive Voice Response systems that provide information or services to callers (e.g., Phone Banking), Automatic Call Distributor (ACD) systems etc. In the business setting, businesses have coupled media applications with their PBX systems. The traditional way of adding media capability to a PBX has been to attach a separate physical device (e.g., a hardware device) to the PBX for each desired media application. Thus, to add voicemail to a PBX, the PBX's owner had to attach a separate voicemail device to the PBX. This was a serious inconvenience for the owners of the PBX, since it was difficult and expensive to add media applications to their PBX. These separate devices also used up physical extensions or ports from the PBX as they had to be connected to the PBX. Aside from the costs, there are other inconveniences as well. Each media application required different software to be able to connect to PBX's made by different manufacturers. This resulted in integration problems and incompatibilities between the two systems. Additionally, because each media application was a different piece of hardware, the media applications either could not communicate with each other at all or, if they could communicate, needed to do so using the PBX as an intermediary, and thus tying up valuable lines for their own communication.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a system and method for software call control are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
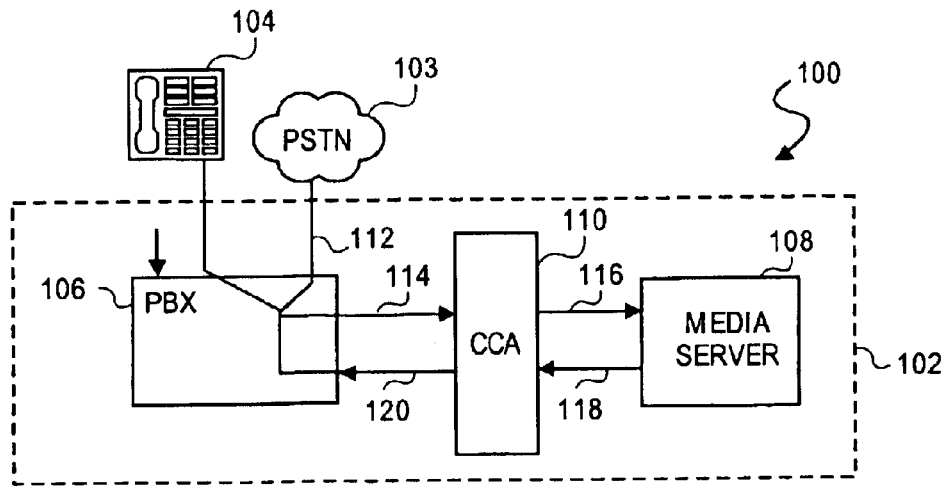
FIG. 1 is a block diagram illustrating an embodiment of the present invention.

FIG. 1 illustrates an embodiment 100 of the present invention. The embodiment 100 comprises a computing platform 102 (e.g., a personal computer or server) connected to, and in communication with, both a public switched telephone network (PSTN) 103 and one or more user terminals 104 (e.g., telephones, computers, or any device capable of communicating over a telephone line). Included within the computing platform 102 are a private branch exchange (PBX) 106 and a media server 108; the PBX 106 and media server 108 are thus integrated on a single platform. Both the PBX and the media server may be implemented within the computing platform 102 in hardware (e.g., separate cards) or software, or a combination of the two. Additionally, in other embodiments the PBX and the media server may be implemented on separate computing platforms and connected together using standard computing networking technology. The PBX 106 and media server 108 communicate with each other via the Software Call Control Agent (CCA) 110. The CCA may be implemented on the same single computing platform as the PBX or media server. If the PBX and media server are implemented on separate computing platforms, the CCA may be implemented on either platform or even on a third platform. All the platforms need to be connected together using standard computing network technology.

The CCA 110 embodies software that functions as an intermediary and a communication channel between the PBX and the media server integrated on the platform 102. Thus, whereas previously the PBX and the media server would have had to communicate over physical lines (e.g., wires), the CCA 110 provides a "virtual line" in the form of a software communication channel, over which the two components can communicate. To accomplish the integration of the PBX and the media server on the computing platform 102, the CCA 110 is integrated with both components. As a result, the PBX 106 views the CCA 110 as a line, while the media server 108 views the CCA 110 as a media stream. In other words, to the PBX the CCA is nothing but another device to which it can connect calls, while to the media server 108 the CCA 110 is viewed just as any other source from which it receives media requests and information. The PBX thus, in communicating with the CCA, does not realize that it is communicating with software or with a virtual device instead of with some physical device, such as a hardware media server or a telephone station (e.g., a telephone). Getting the PBX to view the CCA as a line is accomplished by "registering" the CCA with the PBX as if it were any other line, or a line going to a physical device. For example, if the PBX previously reached a voice mail system by dialing a code, say 8000, then the CCA is registered with the PBX by a similar code, and the PBX can reach the CCA simply by dialing that code. Similarly, the CCA 110 is registered with a media server 108, such that the media server 108 views the CCA as it does any other source of media commands or information with which it can communicate.

Using a CCA allows any media server and any PBX to be connected easily together or integrated easily together, no matter what the manufacture of the PBX or the media server. Applications running on the media server can be treated, from the point of view of the PBX, simply as other devices to which the PBX can establish connections; to the PBX, then, the CCA is a transparent means of establishing a connection between the PBX and a media application.

In operation, the PBX receives an incoming telephone call, which may originate either from one of the terminals 104 that form part of the PBX group, or from the PSTN 103, which connects to terminals outside the PBX group. If the incoming call requests use of a media application found on the media server 108, the PBX 106 initially establishes a connection with the CCA—which was previously registered as a regular line device with the PBX—using its normal call control protocol. As previously described, to the PBX 106 the CCA looks like any other line through which it communicates with devices. This virtual communication channel thus established with the CCA uses standard call control messages published by the PBX vendor to communicate with the PBX software. Hence the PBX software is not even aware that the device with which it is communicating is a virtual one.

After opening a communication channel between the PBX 106 and the CCA 110, at 114 the PBX forwards a request to the CCA in the form of a call object. The CCA will associate a media handle to this call object. The media handle is a code that includes access control information for a particular media application (e.g., an audio player, an audio recorder, streaming video player, and the like), as well as a pointer to the call object to which it is attached. At 116, the CCA forwards the call object with its associated media handle to the media server 108. Upon receiving the call object, the media server 108 examines the media handle, determines which media application is being requested, accesses that application, and attaches that application to the media handle.

Once the media server 108 has attached the proper application to the media handle contained in the call object, then at 118 the media server has the information it needs to establish a communication channel with the CCA, which in turn at 120 establishes a communication channel to the PBX. The PBX then completes the connection between the media application and the terminal or other device originating the call, whether that device is part of the PBX group or is connected to the PSTN. Through the switching apparatus found in the PBX, the media server, with the help of the CCA, establishes a connection directly between the media server and the end point of the call coming through the PBX. The CCA 110 uses standard media server commands published by the media server vendor to communicate with the media server 108. Hence, the media server is not even aware that the device it is communicating with is a virtual one. Although discussed above in the context of a single connection, the CCA 110 is, of course, capable of simultaneously opening and maintaining many software communication channels, or "virtual lines," between the PBX and the media server.

Standard programming interfaces are used to manage communications between the PBX 106 and the CCA 110, or between the CCA and the media server 108. For example, telephony application programming interface (TAPI), developed jointly by Intel and Microsoft, is used for connecting telephone services to personal computers running the Microsoft Windows operating system. The TAPI standard supports connections by individual computers as well as LAN connections serving many computers. Within each connection type, TAPI defines standards for simple call control and for manipulating call content.

Figure 2:
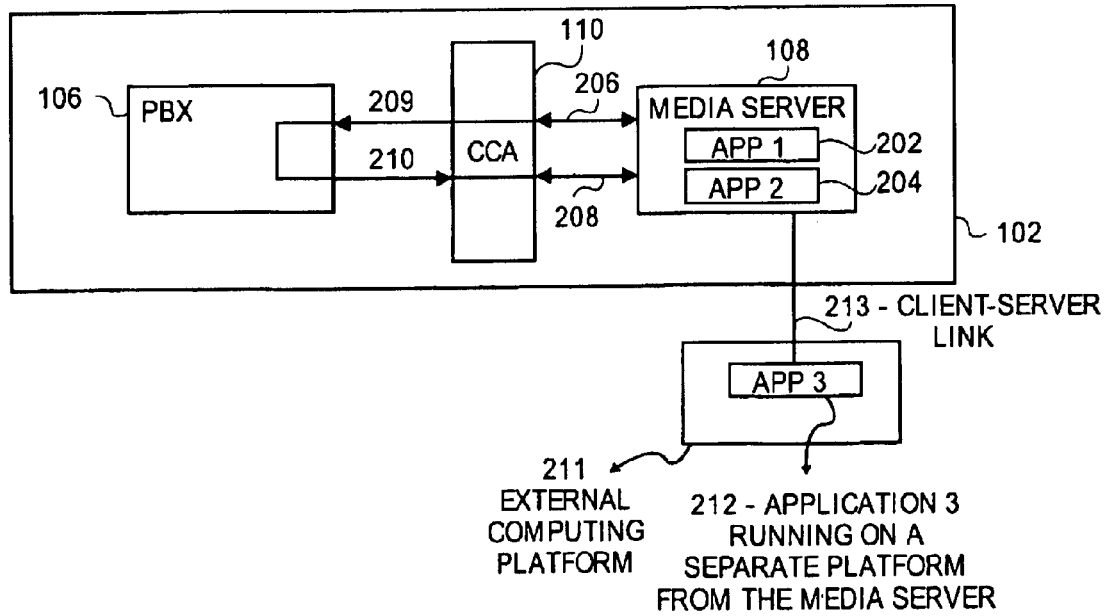
FIG. 2 is a block diagram illustrating an embodiment of the present invention in which there is communication and data interchange between different media applications.

FIG. 2 illustrates an alternative or additional embodiment of the invention 200. In the embodiment 200, the CCA 110, because of its function as a virtual communication channel, allows not only communication between the PBX and the media server, as described above, but also connection between two or more applications found on the media server. In another embodiment, media applications may also run on a separate platform 211 connected to the media server 108 using a client-server connection 213. In the embodiment 200, a first application 202 connected to the media server can communicate with the second application 204 also connected to the same media server simply by placing a call to the second application. The PBX is responsible for translating the dialed number provided by the first application to establish a call to the second application by going through the CCA 110. In an embodiment having media applications running on a separate platform 211 separate from the media server, the applications can also communicate this same way. Using the destination number provided by the first application 202, the CCA establishes a communication channel 209 to the PBX. The PBX determines that the destination number is the CCA and establishes a second communications channel 210 to the CCA. The CCA then establishes a communications channel 208 to the second application 204, based on this incoming call from the PBX. There is now no need to use an external physical line to connect applications together that need to pass voice-processing data to each other. This concept is called "application-to-application make call."

Figure 3:
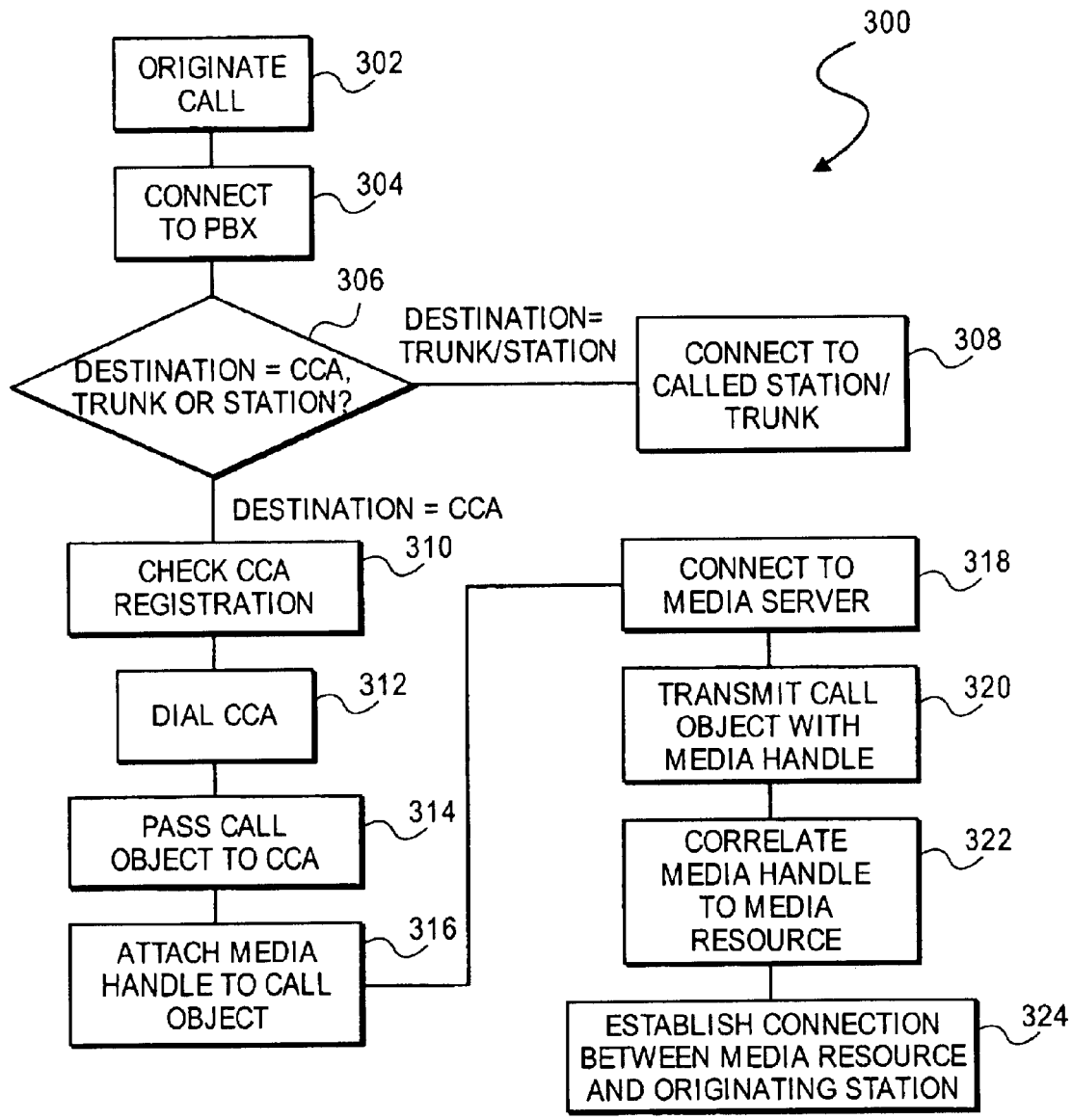
FIG. 3 is a flowchart illustrating an embodiment of a process of the present invention.

FIG. 3 is a flowchart illustrating an embodiment 300 of the operation of the CCA 110. At 302, a call to the PBX originates, either from a terminal 104 within the PBX group, from an external terminal accessing the PBX through the PSTN 103, or from a media application running on the media server 108. The PBX examines the number dialed by the originator of the call and determines where the destination of the call is. If an incoming call does not request an application from the media server, then at 308 the originating call is connected to the call station or to a trunk device connected to another switch or PSTN. This would happen, for example, when a terminal within or outside the PBX group is calling another terminal connected to the PBX or placing a call to an external switch. If the incoming call does request use of a media resource, then at 310 the PBX checks its registrations to find the registration for the CCA, through which it will route the incoming call. Having found the registration for the CCA, then at 312 the PBX dials the CCA and establishes a communication channel between itself and the CCA. Once the communication channel is open and a connection between the PBX and the CCA is established, then the PBX at 314 passes a call object to the CCA; as described previously.

Having passed the call object to the CCA, the CCA at 318 establishes a connection to the media server. The CCA also associates a media handle with the call object. As discussed above, the media server 108 simply views the CCA as a media stream, and does not know that it is communicating with a software communication channel or virtual media stream. Once the connection between the CCA and the media server is established, the CCA passes the call object including the media handle to the media server at 320. At 322, the media server then correlates the media handle to the media resource or application requested by the caller. Finally, at 324, the media server attaches the proper media resource to the call object, and through the switching apparatus found on the media server and the PBX, establishes a connection directly between the caller the media application being requested. The terminal that originated the call is then free to use and interact with the appropriate media application.

Figure 4:
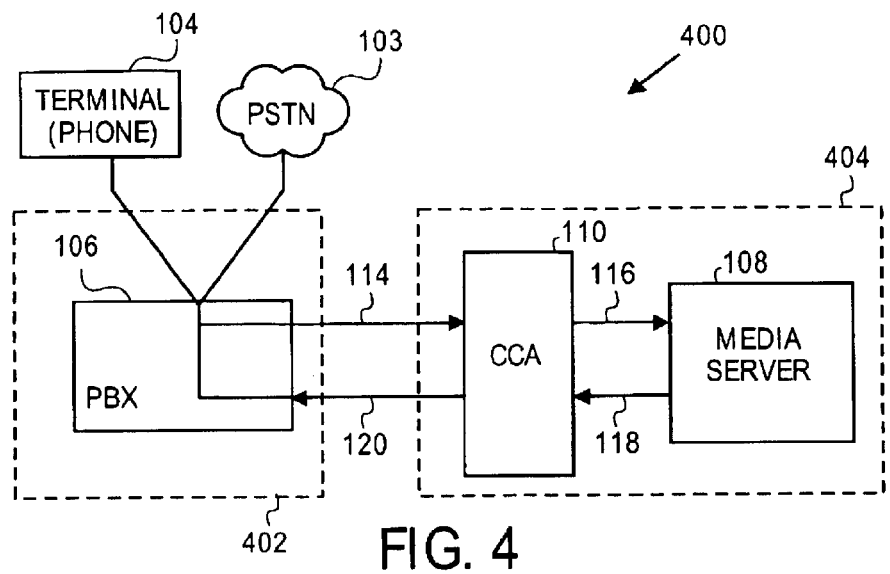
FIG. 4 is a block diagram illustrating a further embodiment of the invention.
Figure 5:
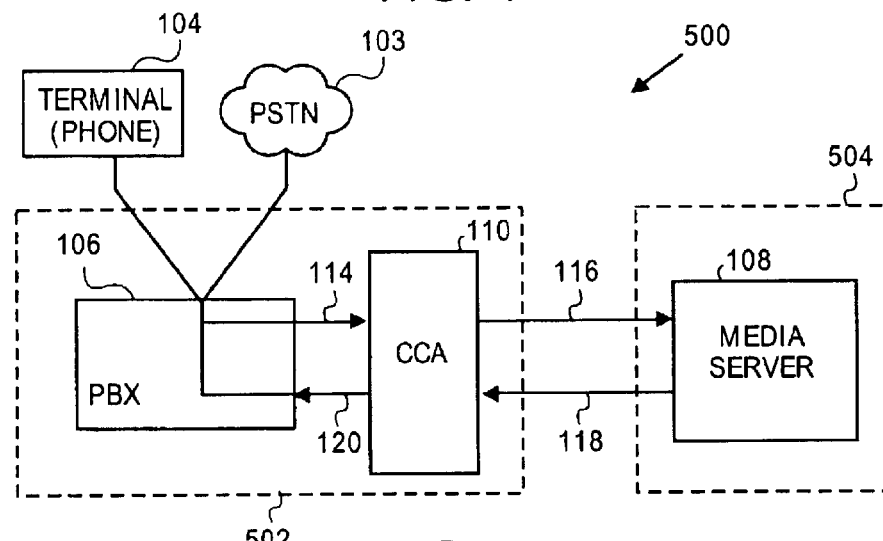
FIG. 5 is a block diagram illustrating a further embodiment of the invention.
Figure 6:
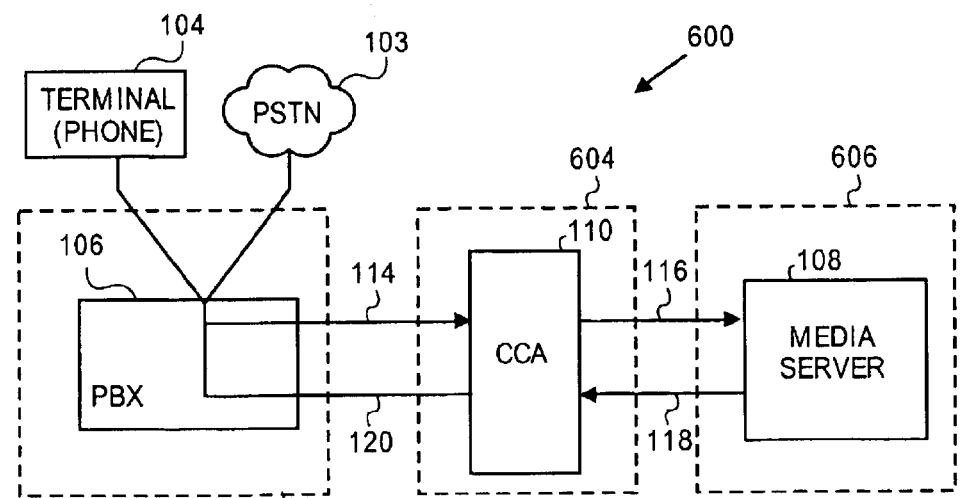
FIG. 6 is a block diagram illustrating a further embodiment of the invention.

FIGS. 4–6 illustrate alternative or additional embodiments of the invention, wherein the PBX 106, the media server 108 and the CCA 110 are combined in different ways using different platforms. FIG. 4 illustrates an embodiment 400 in which the PBX 108 is on a first platform 402, while the CCA 110 and the media server 108 are combined on a second platform 404. The embodiment 400 functions in the same manner as the embodiment 200, except that the different component are no longer on the same platform, but instead are on two platforms that are networked together using networking technology well known in the art. FIG. 5 illustrates an embodiment 500 in which the PBX 106 and the CCA 110 are combined on a first platform 502, while the media server 108 is alone on a second platform 504. As with the embodiment 400, the embodiment 500 operates the same way as the embodiment 200, and the platforms 502 and 504 communicate with each other using well-known networking technology. FIG. 6 illustrates yet another embodiment 600 in which the PBX 106 is on a first platform 602, the CCA 110 is on a second platform 604, and the media server 108 is on a third platform 606. As before, the PBX, CCA and media server function in the same way, and the three platforms 602, 604, and 606 communicate with each other using well-known network technology.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
    establishing a connection between a private branch exchange (PBX) and a software communication channel, wherein the software communication channel is presented to the PBX as a line;
    establishing a connection between a software communication channel and a media server, wherein the software communication channel is presented to the server as a media stream;
    transmitting a call object including a media handle between the PBX and the media server via the software communication channel;
    attaching a media application to the media handle; and
    establishing a connection between the media application and a calling station.

2. The method of claim 1 wherein the calling station is a terminal or a trunk connected to and in communication with the PBX.

3. The method of claim 1 wherein the calling station is another media application.

4. The method of claim 1 wherein establishing a connection between the software communication channel and the PBX comprises:
    registering the software communication channel with the PBX as a line;
    using the registration to establish a connection between the PBX and the and the software communication channel; and
    routing an incoming request from the PBX to the software communication channel.

5. The method of claim 1 wherein the PBX and the media server are on the same platform.

6. The method of claim 1 wherein the PBX and the software communication channel are on a first platform, the media server is on a second platform, and the first and second platforms communicate via a network.

7. The method of claim 1 wherein the PBX is on a first platform, the software communication channel and the media server are on a second platform, and the first and second platforms communicate via a network.

8. The method of claim 1 wherein the PBX is on a first platform, the software communication channel is on a second platform, the media server is on a third platform, and the first, second and third platforms communicate via a network.

9. An article of manufacture, comprising:
    a machine-readable medium having instructions stored thereon to:
    establish a connection between a private branch exchange (PBX) and a software communication channel, wherein the software communication channel is presented to the PBX as a line;
    establish a connection between a software communication channel and a media server, wherein the software communication channel is presented to the server as a media stream;
    transmit a call object including a media handle between the PBX and the media server via the software communication channel;
    attach a media application to the media handle; and
    establish a connection between the media application and a calling station.

10. The article of manufacture of claim 9 wherein the calling station is a terminal or a trunk connected to and in communication with the PBX.

11. The article of manufacture of claim 9 wherein the calling station is another media application.

12. The article of manufacture of claim 9 wherein the instructions to establish a connection between the software communication channel and the PBX comprise instructions to:
   register the software communication channel with the PBX as a line;
   use the registration to establish a connection between the PBX and the and the software communication channel; and
   route an incoming request from the PBX to the software communication channel.

13. The article of manufacture of claim 9 wherein the PBX and the media server are on the same platform.

14. The article of manufacture of claim 9 wherein the PBX and the software communication channel are on a first platform, the media server is on a second platform, and the first and second platforms communicate via a network.

15. The article of manufacture of claim 9 wherein the PBX is on a first platform, the software communication channel and the media server are on a second platform, and the first and second platforms communicate via a network.

16. The article of manufacture of claim 9 wherein the PBX is on a first platform, the software communication channel is on a second platform, the media server is on a third platform, and the first, second and third platforms communicate via a network.

17. An apparatus comprising:
   a computing platform including a private branch exchange (PBX);
   a media server installed on the computing platform; and
   software operative with the computing platform and the media server to
     establish a connection between a private branch exchange (PBX) and a software communication channel, wherein the software communication channel is presented to the PBX as a line;
     establish a connection between a software communication channel and a media server, wherein the software communication channel is presented to the server as a media stream;
     transmit a call object including a media handle between the PBX and the media server via the software communication channel;
     attach a media application to the media handle; and
     establish a connection between the media application and a calling station.

18. The apparatus of claim 17 wherein the calling station is a terminal or a trunk connected to and in communication with the PBX.

19. The apparatus of claim 17 wherein the calling station is another media application.

20. The apparatus of claim 17 wherein the software being operative to establish a connection between the software communication channel and the PBX comprises being operative to:
   register the software communication channel with the PBX as a line;
   use the registration to establish a connection between the PBX and the and the software communication channel; and
   route an incoming request from the PBX to the software communication channel.

21. The apparatus of claim 17 wherein the PBX and the media server are on the same platform.

22. The apparatus of claim 17 wherein the PBX and the software communication channel are on a first platform, the media server is on a second platform, and the first and second platforms communicate via a network.

23. The apparatus of claim 17 wherein the PBX is on a first platform, the software communication channel and the media server are on a second platform, and the first and second platforms communicate via a network.

24. The apparatus of claim 17 wherein the PBX is on a first platform, the software communication channel is on a second platform, the media server is on a third platform, and the first, second and third platforms communicate via a network.

* * * * *

UNITED STATES PATENT AND TRADEMARK OFFICE
CERTIFICATE OF CORRECTION

PATENT NO.    : 6,853,720 B2
DATED         : February 8, 2005
INVENTOR(S)   : Ramachandran It is certified that error appears in the above-identified patent and that said Letters Patent is hereby corrected as shown below:

Column 7,
Line 10, delete $2^{nd}$ occurrence of "and the".

Column 8,
Line 21, delete $2^{nd}$ occurrence of "and the".

Signed and Sealed this

Second Day of August, 2005

JON W. DUDAS
*Director of the United States Patent and Trademark Office*